United States Patent
Miwa et al.

(10) Patent No.: US 10,167,919 B2
(45) Date of Patent: Jan. 1, 2019

(54) CYLINDER DEVICE AND COVER MEMBER

(71) Applicants: KYB Corporation, Tokyo (JP); HONDA MOTOR CO., LTD., Tokyo (JP)

(72) Inventors: Masahiro Miwa, Gifu (JP); Kazuma Ando, Gifu (JP); Shinichi Sutou, Kanagawa (JP); Yasutaka Ohta, Saitama (JP); Koji Takami, Saitama (JP)

(73) Assignees: KYB Corporation, Tokyo (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/524,260

(22) PCT Filed: Nov. 4, 2015

(86) PCT No.: PCT/JP2015/081075
§ 371 (c)(1),
(2) Date: May 3, 2017

(87) PCT Pub. No.: WO2016/072426
PCT Pub. Date: May 12, 2016

(65) Prior Publication Data
US 2017/0321779 A1    Nov. 9, 2017

(30) Foreign Application Priority Data

Nov. 4, 2014  (JP) .................................. 2014-224623
Nov. 4, 2014  (JP) .................................. 2014-224630

(51) Int. Cl.
*F16F 9/38*    (2006.01)
*B60G 15/07*   (2006.01)
(Continued)

(52) U.S. Cl.
CPC .............. *F16F 9/38* (2013.01); *B60G 15/063* (2013.01); *B60G 15/07* (2013.01); *F16F 9/3242* (2013.01);
(Continued)

(58) Field of Classification Search
CPC ........ F16F 9/38; F16F 9/3242; F16F 2234/02; F16F 2230/105
See application file for complete search history.

(56) References Cited

U.S. PATENT DOCUMENTS

2015/0091257 A1*  4/2015  Matsumura ............... F16F 9/38
                                                277/636
2015/0240903 A1*  8/2015  Nagai .................... F16F 1/126
                                               188/322.12
(Continued)

FOREIGN PATENT DOCUMENTS

JP    2003-65381 A    3/2003
JP    2014-185656 A   10/2014

OTHER PUBLICATIONS

International Search Report in PCT/JP2015/081075, dated Dec. 8, 2015.

*Primary Examiner* — Vishal R Sahni
(74) *Attorney, Agent, or Firm* — Hauptman Ham, LLP

(57) ABSTRACT

A cylinder device includes a cylinder that has one end from which a piston rod extends, a pipe-shaped cover member that has an extendable bellows portion and a small-diameter portion whose inner diameter is smaller than an inner diameter of the bellows portion, the cover member being configured to protect the piston rod, and a capping member fitted into the cylinder, the capping member having a convex portion to which the small-diameter portion of the cover member is locked, at an outer periphery, wherein at the
(Continued)

small-diameter portion of the cover member, a bulge portion that bulges outside in a radial direction is formed.

18 Claims, 9 Drawing Sheets

(51) Int. Cl.
*F16J 3/04* (2006.01)
*F16J 15/52* (2006.01)
*F16F 9/32* (2006.01)
*B60G 15/06* (2006.01)

(52) U.S. Cl.
CPC ............... *F16J 3/04* (2013.01); *F16J 3/042* (2013.01); *F16J 15/52* (2013.01); *B60G 2204/1242* (2013.01); *F16F 2230/105* (2013.01); *F16F 2234/02* (2013.01)

(56) References Cited

U.S. PATENT DOCUMENTS

| 2015/0267770 | A1* | 9/2015 | Nagamachi | F16F 9/38 188/297 |
| 2015/0328947 | A1* | 11/2015 | Kawahara | F16F 9/38 267/221 |
| 2016/0075207 | A1* | 3/2016 | Tsunekawa | F16F 9/38 280/124.179 |

* cited by examiner

CYLINDER DEVICE AND COVER MEMBER

RELATED APPLICATIONS

The present application is a National Phase of International Application No. PCT/JP2015/081075, filed Nov. 4, 2015, and claims priority based on Japanese Patent Application Nos. 2014-224623 and 2014-224630, filed Nov. 4, 2014.

TECHNICAL FIELD

The present invention relates to a cylinder device and a cover member.

BACKGROUND ART

For example, at a strut-type shock absorber described in JP2003-65381A, a dust boot as a cover member is held to a bump cap, such that a convex portion at an inner periphery of the dust boot is locked to a flange portion disposed at an outer periphery of the bump cap.

The above-described dust boot includes a thin-walled skirt portion at an end portion, and includes the convex portion locked to the flange portion of the bump cap at an inner periphery of the skirt portion. In view of this, when the dust boot is fitted into the bump cap to press the dust boot to the flange portion, the skirt portion elastically deforms to radially expand, and then, after the convex portion has climbed over the flange portion, the skirt portion radially reduces. This locks the convex portion of the dust boot to the flange portion of the bump cap. Thus, the above-described dust boot can be easily attached to the bump cap such that the skirt portion deforms.

SUMMARY OF INVENTION

However, according to the strut-type shock absorber, there may be a case where the dust boot cannot be attached to the bump cap unless after a coil spring and a mount member are attached to a cylinder.

In this case, a worker inserts a finger into a clearance of the coil spring to press the dust boot to the bump cap only with fingertip force. Thus, even with the above-described technique, it is difficult to attach the dust boot to the bump cap.

It is an object of the present invention to improve attachability of a cover member.

According to one aspect of the present invention, a cylinder device includes a cylinder that has one end from which a piston rod extends, a pipe-shaped cover member that has an extendable bellows portion and a small-diameter portion whose inner diameter is smaller than an inner diameter of the bellows portion, the cover member being configured to protect the piston rod, and a capping member fitted into the cylinder, the capping member having a convex portion to which the small-diameter portion of the cover member is locked, at an outer periphery, wherein at the small-diameter portion of the cover member, a bulge portion that bulges outside in a radial direction is formed.

According to another aspect of the present invention, a cover member includes an extendable pipe-shaped bellows portion, a small-diameter portion locked to a convex portion disposed at an outer periphery of a protected body, an inner diameter of the small-diameter portion being smaller than an inner diameter of the bellows portion, and a bulge portion formed at the small-diameter portion to bulge outside in a radial direction.

DESCRIPTION OF EMBODIMENTS

First Embodiment

The following describes a shock absorber 100 according to a first embodiment of the present invention by referring to FIG. 1 to FIG. 4.

The shock absorber 100 as a cylinder device, which is installed at an automobile (not illustrated), is a strut-type shock absorber that positions a wheel (not illustrated) and generates damping force to reduce vibration of a vehicle body (not illustrated).

Figure 1:
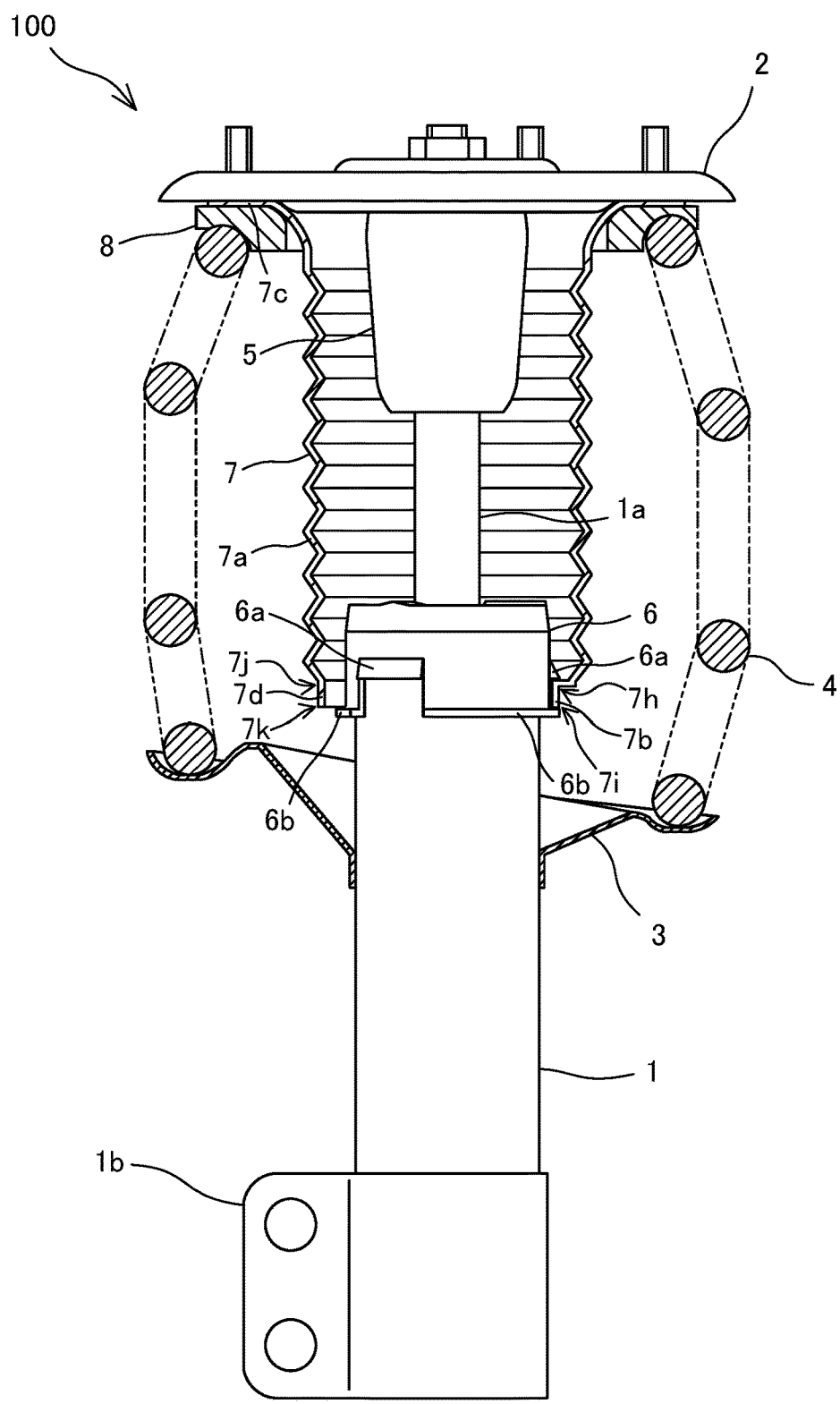
FIG. 1 is a partial cross-sectional view of a shock absorber according to a first embodiment of the present invention.

The shock absorber 100, as illustrated in FIG. 1, includes a cylinder 1 having one end from which a piston rod 1a extends, a mount member 2 coupled to an end portion of the piston rod 1a, a spring sheet 3 disposed at an outer periphery of the cylinder 1, a coil spring 4 interposed between the mount member 2 and the spring sheet 3, a bump stopper 5 fitted into the piston rod 1a, a bump cap 6 as a capping member fitted into an end portion at a piston rod 1a side of the cylinder 1, and a dust boot 7 as a pipe-shaped cover member that protects the piston rod 1a.

At an end portion at a side opposite to the piston rod 1a, of the cylinder 1, a bracket 1b for coupling the shock absorber 100 to a hub carrier (not illustrated) that holds the wheel is disposed. The shock absorber 100 is coupled to the vehicle body by the mount member 2 and coupled to the hub carrier by the bracket 1b to be attached to the vehicle.

The coil spring 4 is sandwiched between the mount member 2 and the spring sheet 3 in a compressed state to bias the cylinder 1 and the mount member 2 in a direction separating from one another. An annular rubber sheet 8 is interposed between the mount member 2 and the coil spring 4 such that the mount member 2 does not directly abut on the coil spring 4.

The bump stopper 5 is made of, for example, rubber or urethane. When the shock absorber 100 contracts to almost the most contracted length, the bump stopper 5 abuts on a top surface of the bump cap 6 to regulate a stroke at a contracted side of the shock absorber 100.

The bump cap 6, which is made of resin, has convex portions 6a disposed at three positions equally divided in a circumferential direction at an outer peripheral surface, and flange portions 6b disposed at an outer peripheral side of an opening end.

Figure 2:
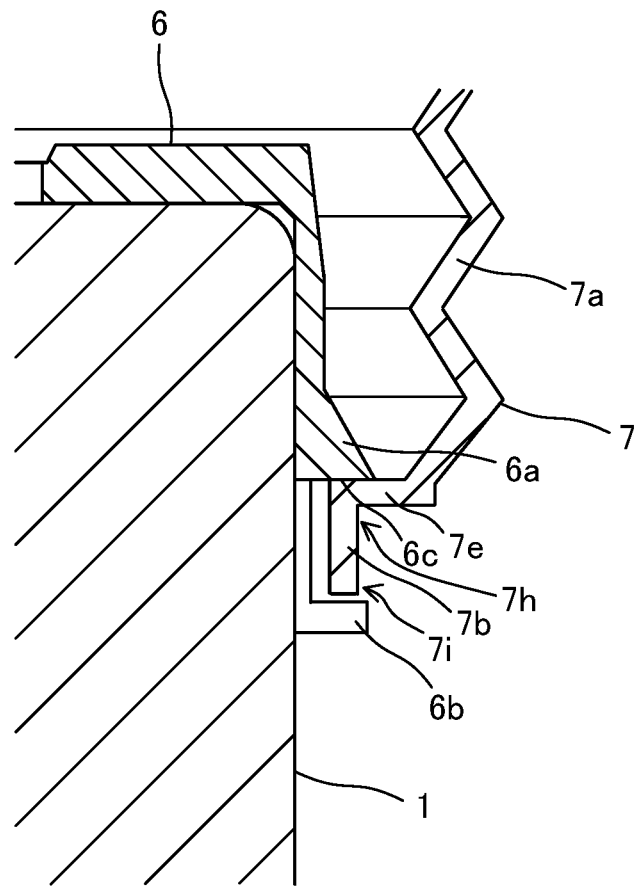
FIG. 2 is a cross-sectional view at a convex portion of a bump cap.

As illustrated in FIG. 2, a shape of the convex portion 6a is a triangle having an apex at a side of the flange portion 6b. An end surface 6c at the flange portion 6b side of the convex portion 6a is a flat portion perpendicular to an axial direction of the shock absorber 100. The convex portion 6a will be described later.

It should be noted that, in this embodiment, as illustrated in FIG. 1, the flange portions 6b are partially disposed. Thus, the convex portions 6a do not overlap the flange portions 6b in the axial direction. This is for considering parting in order to manufacture the bump cap 6 in injection molding.

The dust boot 7, which is made of resin, as illustrated in FIG. 1, has an extendable bellows portion 7a, a small-diameter portion 7b, which is formed at one end, whose inner diameter is smaller than an inner diameter of the bellows portion 7a, and a flange portion 7c formed at an outer peripheral side of another end.

Figure 3:
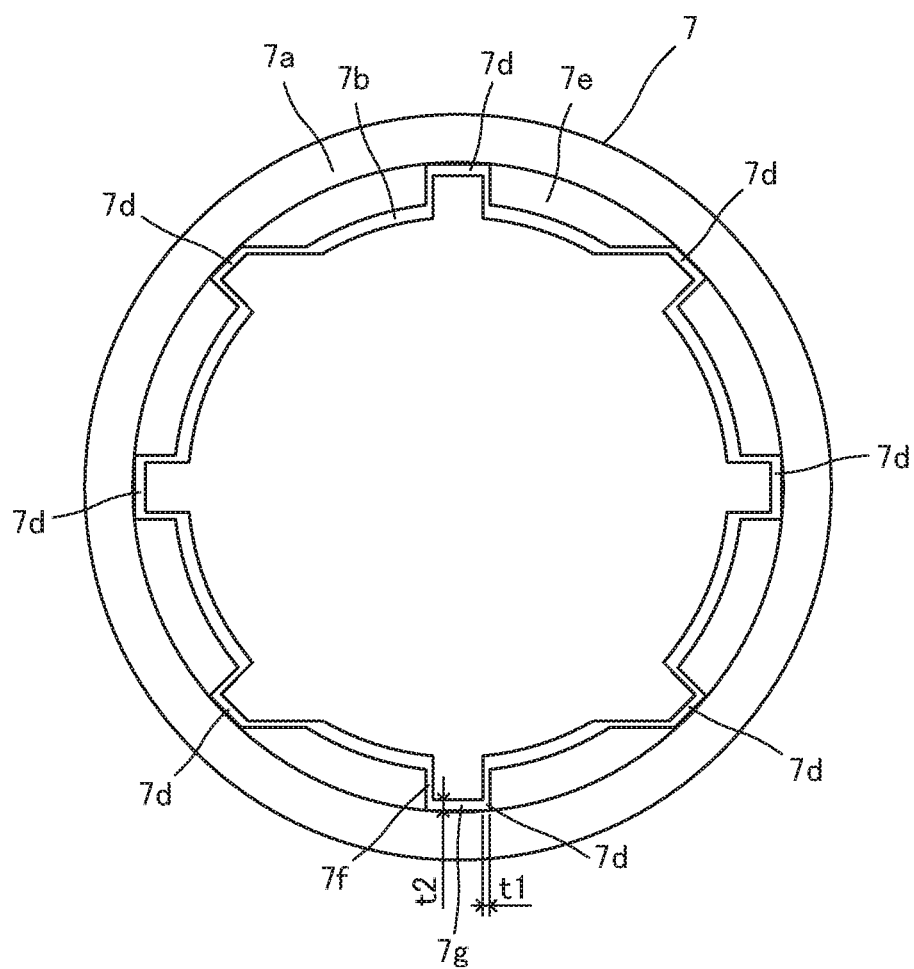
FIG. 3 is a drawing of a dust boot viewed from a small-diameter portion side.
Figure 4:
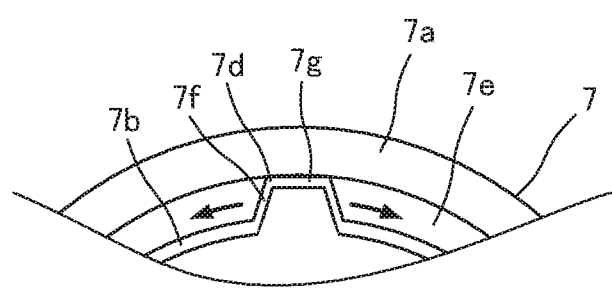
FIG. 4 is a drawing for describing a bulge portion of the dust boot.

As illustrated in FIG. 1 and FIG. 3, bulge portions 7d that bulge outside in a radial direction are formed at the small-diameter portion 7b. In this embodiment, the bulge portions 7d are formed at eight positions. As illustrated in FIG. 2 and FIG. 3, a flat portion 7e that extends outside in the radial direction in a flanged shape is disposed in a range removing the bulge portions 7d, at an end portion at a base end side 7h of the small-diameter portion 7b. The small-diameter portion 7b further has an open end side 7i. The bulge portions 7d and the flat portion 7e will be described later.

It should be noted that, in this embodiment, as illustrated in FIG. 3, the bulge portion 7d of the dust boot 7 has two kinds of shapes. This is for considering parting in order to manufacture the dust boot 7 in blow molding.

Manufacturing the dust boot 7 in the blow molding, as illustrated in FIG. 3, makes a plate thickness t1 of a radial direction portion 7f thinner than a plate thickness t2 of a circumferential direction portion 7g, at the bulge portion 7d. This will be described later.

The dust boot 7 is attached to the shock absorber 100, as illustrated in FIG. 1, such that the flange portion 7c is sandwiched between the mount member 2 and the rubber sheet 8, and the small-diameter portion 7b is held between the convex portion 6a and the flange portion 6b, of the bump cap 6.

Accordingly, in a state where the dust boot 7 is extending from its free length, the small-diameter portion 7b is locked to the convex portion 6a of the bump cap 6. In a state where the dust boot 7 is contracting from its free length, the small-diameter portion 7b is locked to the flange portion 6b of the bump cap 6.

In the state where the small-diameter portion 7b of the dust boot 7 is locked to the convex portion 6a of the bump cap 6, as illustrated in FIG. 2, the flat portion 7e of the dust boot 7 abuts on the end surface 6c at the convex portion 6a of the bump cap 6. As described above, the end surface 6c of the convex portion 6a is flat. Thus, the flat portion 7e of the dust boot 7 makes a surface contact with the end surface 6c of the convex portion 6a.

This ensures decreasing a contact pressure that the dust boot 7 receives from the convex portion 6a of the bump cap 6, when the shock absorber 100 operates to extend the dust boot 7. Accordingly, strength and durability of the dust boot 7 can be improved to ensure preventing the dust boot 7 from slipping from the bump cap 6.

When attaching the dust boot 7 to the bump cap 6, the dust boot 7 is fitted into the bump cap 6 to press the small-diameter portion 7b to the convex portion 6a. As described above, the convex portion 6a is the triangle having the apex at the flange portion 6b side. Thus, force pressing the dust boot 7 acts as force radially expanding the small-diameter portion 7b. In view of this, the small-diameter portion 7b, as indicated by arrows in FIG. 4, radially expands in a state where a perimeter increases such that the bulge portion 7d elastically deforms as extending in a circumferential direction of the small-diameter portion 7b.

It should be noted that the dust boot 7, as described above, is manufactured in the blow molding to ensure making the plate thickness t1 of the radial direction portion 7f thinner than the plate thickness t2 of the circumferential direction portion 7g, at the bulge portion 7d. This facilitates to deform the radial direction portion 7f in the circumferential direction to significantly radially expand the small-diameter portion 7b of the dust boot 7 when attaching the dust boot 7 to the bump cap 6.

In this manner, the small-diameter portion 7b climbs over the convex portion 6a of the bump cap 6. Thereafter, the small-diameter portion 7b radially reduces to be locked to the convex portion 6a after a shape of the bulge portion 7d is restored with elastic force.

Thus, when the dust boot 7 is attached to the bump cap 6, the bulge portion 7d elastically deforms in the circumferential direction of the small-diameter portion 7b. In view of this, the small-diameter portion 7b radially expands in a state the perimeter is extended. This allows the small-diameter portion 7b of the dust boot 7 to easily climb over the convex portion 6a of the bump cap 6, even if the force pressing the dust boot 7 to the bump cap 6 is small. Accordingly, attachability of the dust boot 7 can be improved.

In this embodiment, as described above, the convex portions 6a of the bump cap 6 are disposed at the three positions equally divided in the circumferential direction. Thus, disposing the plurality of convex portions 6a by dividing in the circumferential direction allows the small-diameter portion 7b of the dust boot 7 to climb over the convex portions 6a of the bump cap 6 only by partially radially expanding at the positions of the convex portions 6a of the bump cap 6.

According to this, compare with a case where the convex portion 6a of the bump cap 6 is continuously disposed at the whole circumference, the dust boot 7 can be attached to the bump cap 6, even if the force pressing the dust boot 7 to the bump cap 6 is small.

According to the strut-type shock absorber, there may be a case where a dust boot cannot be attached to a bump cap unless a coil spring and a mount member have been attached to a cylinder. In this case, a worker inserts a finger into a clearance of the coil spring to attach the dust boot to the bump cap only with fingertip force.

In contrast, according to this embodiment, even if the force pressing the dust boot 7 to the bump cap 6 is small, the dust boot 7 can be attached to the bump cap 6. Thus, even after attaching the coil spring 4 and the mount member 2 to the cylinder 1, the dust boot 7 can be easily attached to the bump cap 6.

As described above, according to this embodiment, when attaching the dust boot 7 to the bump cap 6, the bulge portion 7d elastically deforms in the circumferential direction of the small-diameter portion 7b. In view of this, the small-diameter portion 7b radially expands in the state where the perimeter is extended. According to this, even if the force pressing the dust boot 7 to the bump cap 6 is small, the small-diameter portion 7b of the dust boot 7 easily climbs over the convex portion 6a of the bump cap 6. Accordingly, the attachability of the dust boot 7 can be improved.

Second Embodiment

Then, a shock absorber 200 according to a second embodiment of the present invention will be described by referring to FIG. 5 to FIG. 9.

The shock absorber 200 has a shape of a dust boot different from that at the shock absorber 100. The following mainly describes differences from the shock absorber 100. Like reference numerals designate configurations at the shock absorber 100, and therefore such configurations will not be further elaborated here.

Figure 5:
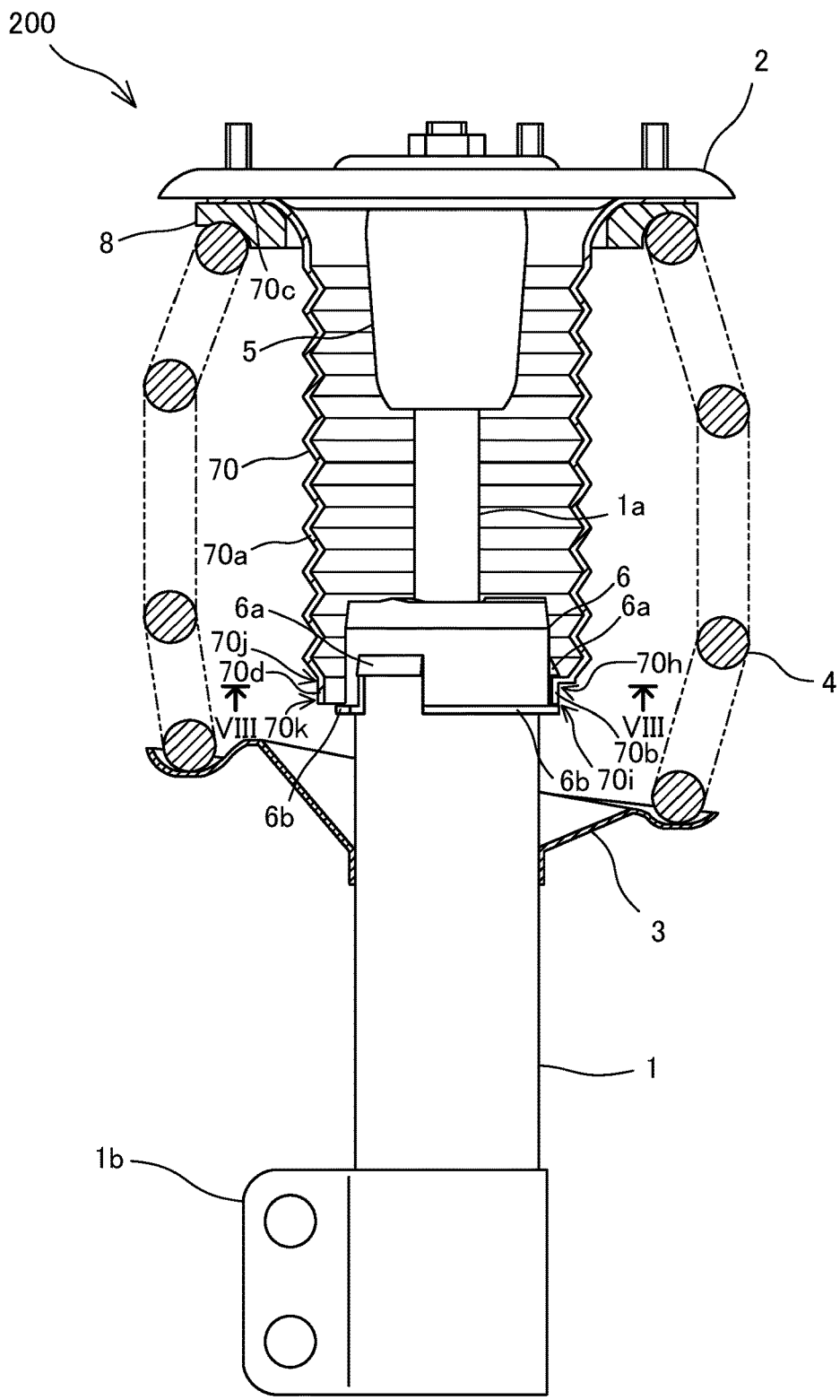
FIG. 5 is a partial cross-sectional view of a shock absorber according to a second embodiment of the present invention.

A dust boot 70 included in the shock absorber 200, which is made of resin, as illustrated in FIG. 5, has an extendable bellows portion 70a, a small-diameter portion 70b, which is formed at one end, whose inner diameter is smaller than an inner diameter of the bellows portion 70a, and a flange portion 70c formed at an outer peripheral side of another end.

Figure 6:
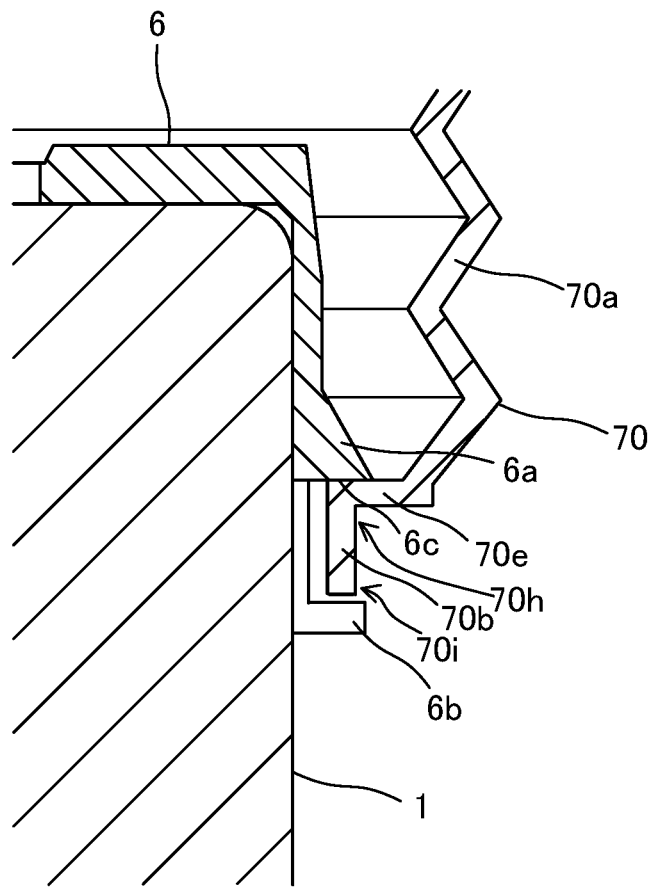
FIG. 6 is a cross-sectional view at a convex portion of a bump cap.
Figure 7:
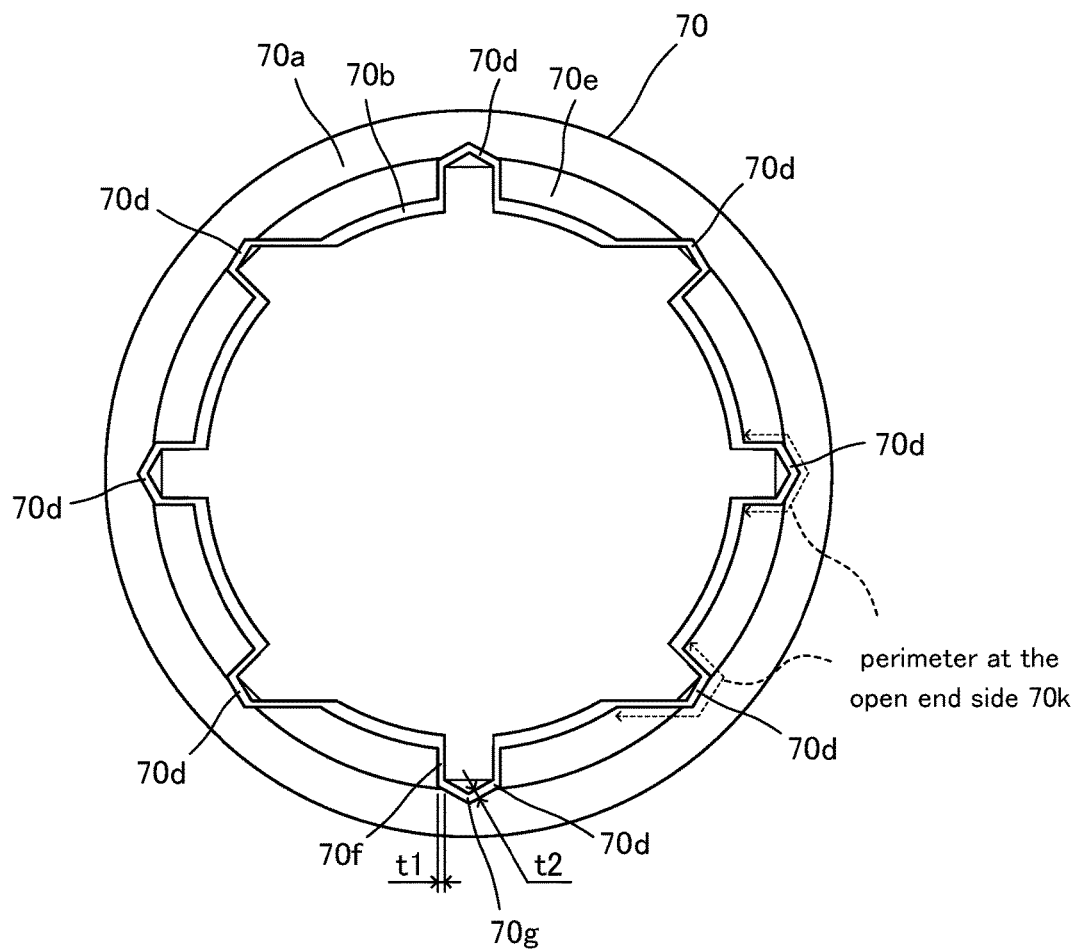
FIG. 7 is a drawing of a dust boot viewed from a small-diameter portion side.
Figure 8:
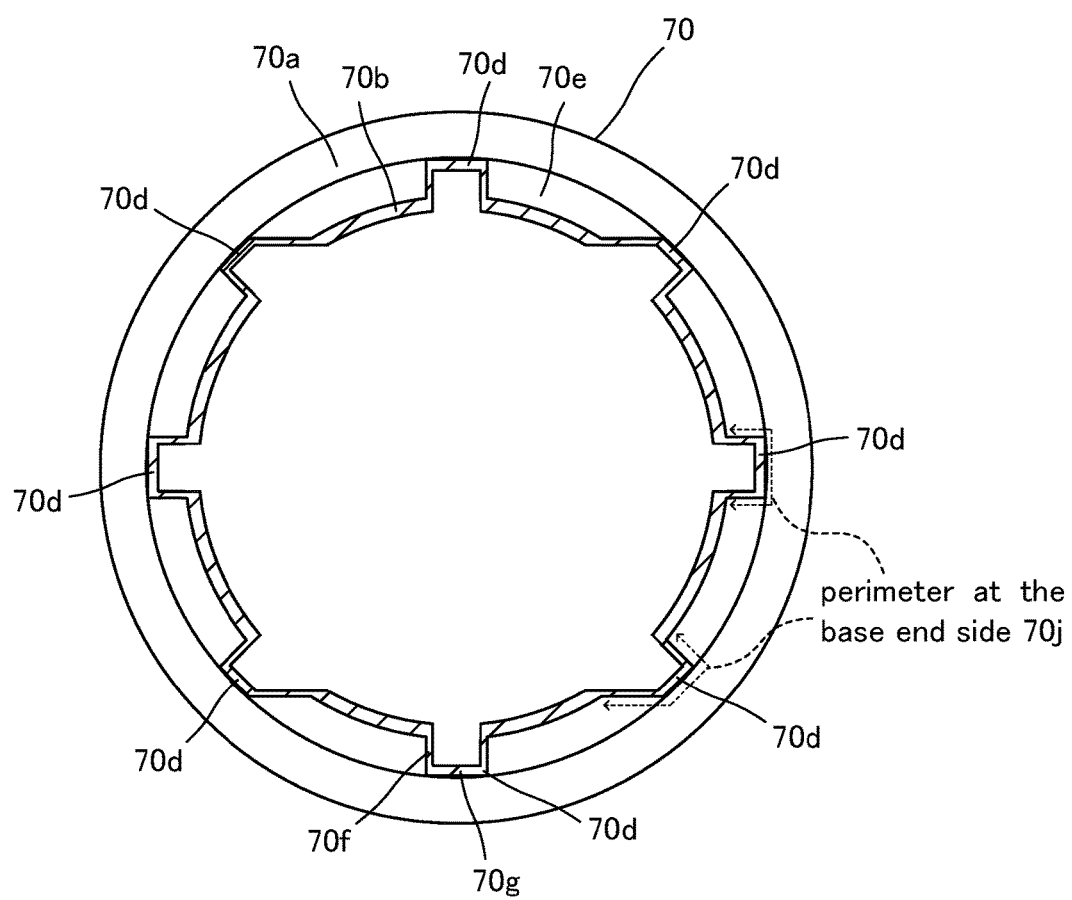
FIG. 8 is a drawing illustrating the dust boot at a cross section along the line VIII-VIII in FIG. 5.
Figure 9:
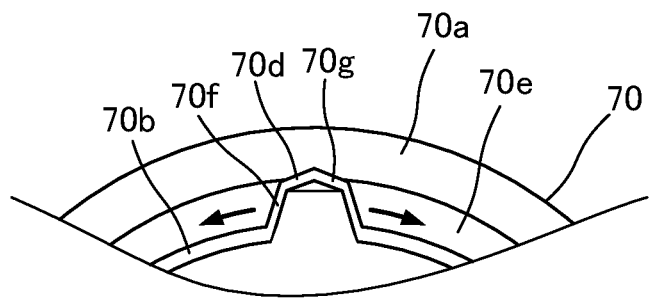
FIG. 9 is a drawing for describing a bulge portion of the dust boot.

As illustrated in FIG. 5, FIG. 7, and FIG. 8, bulge portions 70d that bulge outside in a radial direction are formed at the small-diameter portion 70b. In this embodiment, the bulge portions 70d are formed at eight positions. As illustrated in FIG. 6 to FIG. 8, a flat portion 70e that extends outside in the radial direction in a flanged shape is disposed in a range removing the bulge portions 70d, at an end portion at a base end side 70h of the small-diameter portion 70b. The small-diameter portion 70b further has an open end side 70i.

It should be noted that, in this embodiment, as illustrated in FIG. 7 and FIG. 8, the bulge portion 70d of the dust boot 70 has two kinds of shapes. This is for considering parting in order to manufacture the dust boot 70 in blow molding.

Manufacturing the dust boot 70 in the blow molding, as illustrated in FIG. 7, makes a plate thickness t1 of a radial direction portion 70f thinner than a plate thickness t2 of a circumferential direction portion 70g, at the bulge portion 70d.

The dust boot 70 is attached to the shock absorber 200, as illustrated in FIG. 5, such that the flange portion 70c is sandwiched between the mount member 2 and the rubber sheet 8, and the small-diameter portion 70b is held between the convex portion 6a and the flange portion 6b, of the bump cap 6.

Accordingly, in a state where the dust boot 70 is extending from its free length, the small-diameter portion 70b is locked to the convex portion 6a of the bump cap 6. In a state where the dust boot 70 is contracting from its free length, the small-diameter portion 70b is locked to the flange portion 6b of the bump cap 6.

In the state where the small-diameter portion 70b of the dust boot 70 is locked to the convex portion 6a of the bump cap 6, as illustrated in FIG. 6, the flat portion 70e of the dust boot 70 abuts on the end surface 6c at the convex portion 6a of the bump cap 6. As described above, the end surface 6c of the convex portion 6a is flat. Thus, the flat portion 70e of the dust boot 70 makes a surface contact with the end surface 6c of the convex portion 6a.

This ensures decreasing a contact pressure that the dust boot 70 receives from the convex portion 6a of the bump cap 6, when the shock absorber 200 operates to extend the dust boot 70. Accordingly, strength and durability of the dust boot 70 can be improved to ensure preventing the dust boot 70 from slipping from the bump cap 6.

When attaching the dust boot 70 to the bump cap 6, the dust boot 70 is fitted into the bump cap 6 to press the small-diameter portion 70b to the convex portion 6a. As described above, the convex portion 6a is the triangle having the apex at the flange portion 6b side. Thus, force pressing the dust boot 70 acts as force radially expanding the small-diameter portion 70b. In view of this, the small-diameter portion 70b, as indicated by arrows in FIG. 9, radially expands in a state where a perimeter increases such that the bulge portion 70d elastically deforms as extending in a circumferential direction of the small-diameter portion 70b.

It should be noted that the dust boot 70, as described above, is manufactured in the blow molding to ensure making the plate thickness t1 of the radial direction portion 70f thinner than the plate thickness t2 of the circumferential direction portion 70g, at the bulge portion 70d. This facilitates to deform the radial direction portion 70f in the circumferential direction to significantly radially expand the small-diameter portion 70b of the dust boot 70 when attaching the dust boot 70 to the bump cap 6.

In this manner, the small-diameter portion 70b climbs over the convex portion 6a of the bump cap 6. Thereafter, the small-diameter portion 7b radially reduces to be locked to the convex portion 6a after a shape of the bulge portion 70d is restored with elastic force.

As seen from FIG. 7 and FIG. 8, the bulge portion 70d of the dust boot 70 is formed such that a bulge at an open end side 70k is larger than a bulge at the base end side 70j. This indicates that, at the bulge portion 70d, a perimeter at the open end side 70k is longer than a perimeter at the base end side 70j, and a rigidity at the open end side 70k is lower than a rigidity at the base end side 70j.

According to this, when pressing the small-diameter portion 70b of the dust boot 70 to the convex portion 6a of the bump cap, the open end side 70k deforms more largely than the base end side 70j, at the bulge portion 70d. In view of this, the small-diameter portion 70b radially expands in a taper shape such that expansion at the open end side 70i is larger than expansion at the base end side 70h.

Thus, the dust boot 70, when attaching to the bump cap 6, becomes in a state where the bulge portion 70d elastically deforms in the circumferential direction of the small-diameter portion 70b, and the perimeter of the small-diameter portion 70b is extended. At this time, the open end side 70k deforms more largely than the base end side 70j, at the bulge portion 70d. Thus, the small-diameter portion 70b radially expands in the taper shape such that the expansion at the open end side 70i becomes larger than the expansion at the base end side 70h. This allows the small-diameter portion 70b of the dust boot 70 to easily climb over the convex portion 6a of the bump cap 6, even if the force pressing the dust boot 70 to the bump cap 6 is small. Accordingly, attachability of the dust boot 70 can be improved.

Figure 10:
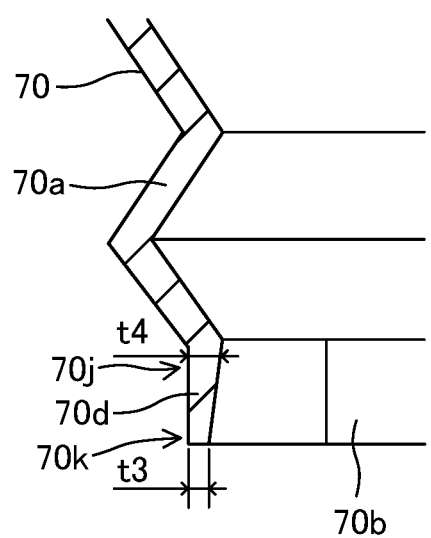
FIG. 10 is a drawing illustrating a modification of the dust boot.

The state where the rigidity at the open end side 70k is lower than the rigidity at the base end side 70j, at the bulge portion 70d of the dust boot 70, as illustrated in FIG. 10, is also achieved by making a plate thickness t3 at the open end side 70k thinner than a plate thickness t4 at the base end side 70j, at the bulge portion 70d. It should be noted that the plate thickness t3 at the open end side 70k may be made thinner than the plate thickness t4 at the base end side 70j, at the bulge portion 70d, while making the bulge at the open end side 70k larger than the bulge at the base end side 70j, at the bulge portion 70d.

In this embodiment, similar to the first embodiment, the convex portions 6a of the bump cap 6 are disposed at the three positions equally divided in the circumferential direction. Thus, disposing the plurality of convex portions 6a by dividing in the circumferential direction allows the small-diameter portion 70b of the dust boot 70 to climb over the convex portions 6a of the bump cap 6 only by partially radially expanding at the positions of the convex portions 6a of the bump cap 6.

According to this, compare with a case where the convex portion 6a of the bump cap 6 is continuously disposed at the whole circumference, the dust boot 70 can be attached to the bump cap 6, even if the force pressing the dust boot 70 to the bump cap 6 is small.

According to this embodiment, even if the force pressing the dust boot 70 to the bump cap 6 is small, the dust boot 70 can be attached to the bump cap 6. Thus, similar to the first embodiment, even after attaching the coil spring 4 and the mount member 2 to the cylinder 1, the dust boot 70 can be easily attached to the bump cap 6.

As described above, according to this embodiment, when attaching the dust boot 70 to the bump cap 6, the dust boot 70 becomes in a state where the bulge portion 70d elastically deforms in the circumferential direction of the small-diameter portion 70b, and the perimeter of the small-diameter portion 70b is extended. At this time, the open end side 70k deforms more largely than the base end side 70j, at the bulge portion 70d. Thus, the small-diameter portion 70b radially expands in the taper shape such that the expansion at the open end side 70i becomes larger than the expansion at the base end side 70h. This allows the small-diameter portion 70b of the dust boot 70 to easily climb over the convex portion 6a of the bump cap 6, even if the force pressing the dust boot 70 to the bump cap 6 is small. Accordingly, the attachability of the dust boot 70 can be improved.

The radial direction portion 70f at the bulge portion 70d easily deforms in the circumferential direction. Thus, when attaching the dust boot 70 to the bump cap 6, the small-diameter portion of the dust boot 70 largely radially expands. Accordingly, even if the force pressing the dust boot 70 to the bump cap 6 is small, the dust boot 70 can be attached to the bump cap 6.

The dust boot 70 makes a surface contact with the convex portion 6a of the bump cap 6 by the flat portion 70e. This ensures decreasing the contact pressure that the dust boot 70 receives from the convex portion 6a of the bump cap 6, when the shock absorber 200 operates to extend the dust boot 70. Accordingly, the strength and the durability of the dust boot 70 can be improved to ensure preventing the dust boot 70 from slipping from the bump cap 6.

Disposing the plurality of convex portions 6a of the bump cap 6 by dividing in the circumferential direction allows the small-diameter portion 70b of the dust boot 70 to climb over the convex portions 6a of the bump cap 6 only by partially radially expanding at the positions of the convex portions 6a of the bump cap 6. Accordingly, compare with the case where the convex portion 6a of the bump cap 6 is continuously disposed at the whole circumference, the dust boot 70 can be attached to the bump cap 6, even if the force pressing the dust boot 70 to the bump cap 6 is small.

The following describes the configuration, the action, and the effect according to the embodiments of the present invention as a whole.

The shock absorbers 100 and 200 include the cylinders 1 at which the piston rods 1a extend from the one ends, the pipe-shaped dust boots 7 and 70 that have the extendable bellows portions 7a and 70a and the small-diameter portions 7b and 70b whose inner diameters are smaller than the inner diameters of the bellows portions 7a and 70a to protect the piston rods 1a, and the bump caps 6 fitted into the cylinders 1 to have the convex portions 6a at the outer peripheries. The small-diameter portions 7b and 70b of the dust boots 7 and 70 are locked to the convex portions 6a. The bulge portions 7d and 70d that bulge outside in the radial directions are formed at the small-diameter portions 7b and 70b of the dust boots 7 and 70.

The dust boots 7 and 70 have the extendable pipe-shaped bellows portions 7a and 70a, the small-diameter portions 7b and 70b whose inner diameters are smaller than the inner diameters of the bellows portions 7a and 70a locked to the convex portions 6a disposed at the outer peripheries of the bump caps 6, and the bulge portions 7d and 70d formed at the small-diameter portions 7b and 70b to bulge outside in the radial directions.

In these configurations, when attaching the dust boots 7 and 70 to the bump caps 6, the bulge portions 7d and 70d elastically deform in the circumferential directions of the small-diameter portions 7b and 70b. In view of this, the small-diameter portions 7b and 70b radially expand in the state where the perimeters are extended. This allows the small-diameter portions 7b and 70b of the dust boots 7 and 70 to easily climb over the convex portions 6a of the bump caps 6, even if the force pressing the dust boots 7 and 70 to the bump caps 6 is small. Accordingly, the attachability of the dust boots 7 and 70 can be improved.

The rigidity at the open end side 70k of the bulge portion 70d is lower than the rigidity at the base end side 70j of the bulge portion 70d, at the dust boot 70.

The perimeter at the open end side 70k of the bulge portion 70d is longer than the perimeter at the base end side 70j of the bulge portion 70d, at the dust boot 70.

The bulge at the open end side 70k of the bulge portion 70d is larger than the bulge at the base end side 70j of the bulge portion 70d, at the dust boot 70.

The plate thickness t3 at the open end side 70k of the bulge portion 70d is thinner than the plate thickness t4 at the base end side 70j of the bulge portion 70d, at the dust boot 70.

In these configurations, when attaching the dust boot 70 to the bump cap 6, the dust boot 70 is in the state where the bulge portion 70d elastically deforms in the circumferential direction of the small-diameter portion 70b, and the perimeter of the small-diameter portion 70b is extended. At this time, the open end side 70k deforms more largely than the base end side 70j at the bulge portion 70d. Thus, the small-diameter portion 70b radially expands in the taper shape such that the expansion at the open end side 70i becomes larger than the expansion at the base end side 70h. This allows the small-diameter portion 70b of the dust boot 70 to easily climb over the convex portion 6a of the bump cap 6, even if the force pressing the dust boot 70 to the bump cap 6 is small. Accordingly, the attachability of the dust boot 70 can be improved.

The plate thicknesses t1 of the radial direction portions 7f and 70f are thinner than the plate thicknesses t2 of the circumferential direction portions 7g and 70g, at the bulge portions 7d and 70d of the dust boots 7 and 70.

In this configuration, the radial direction portions 7f and 70f at the bulge portions 7d and 70d easily deform in the circumferential directions. Thus, when attaching the dust boots 7 and 70 to the bump caps 6, the small-diameter portions of the dust boots 7 and 70 largely radially expand. According to this, even if the force pressing the dust boots 7 and 70 to the bump caps 6 is small, the dust boots 7 and 70 can be attached to the bump caps 6.

At the end portions at the base end sides 7h and 70h of the small-diameter portions 7b and 70b at the dust boots 7 and 70, the flat portions 7e and 70e that extend outside in the radial directions in the flanged shapes to be locked to the convex portions 6a of the bump caps 6 are disposed in the ranges removing the bulge portions 7d and 70d.

In this configuration, the dust boots 7 and 70 make surface contacts with the convex portions 6a of the bump caps 6 by the flat portions 7e and 70e. This ensures decreasing the contact pressures that the dust boots 7 and 70 receive from the convex portions 6a of the bump caps 6, when the shock absorbers 100 and 200 operate to extend the dust boots 7 and 70. Accordingly, the strength and the durability of the dust boots 7 and 70 can be improved to ensure preventing the dust boots 7 and 70 from slipping from the bump caps 6.

The plurality of convex portions 6a of the bump cap 6 are disposed by dividing in the circumferential direction.

In this configuration, the small-diameter portions 7b and 70b of the dust boots 7 and 70 can climb over the convex portions 6a of the bump caps 6 only by partially radially expanding at the positions of the convex portions 6a of the bump caps 6. Accordingly, the dust boots 7 and 70 can be attached to the bump caps 6, even if the force pressing the dust boots 7 and 70 to the bump caps 6 is small.

The dust boots 7 and 70 installed at the shock absorbers 100 and 200 including the cylinders 1 at which the piston rods 1a extend from the one ends and the bump caps 6 fitted into the cylinders 1 to include the convex portions 6a at the outer peripheries, to protect the piston rods 1a, have the extendable bellows portions 7a and 70a, the small-diameter portions 7b and 70b whose inner diameters are smaller than the inner diameters of the bellows portions 7a and 70a locked to the convex portions 6a of the bump caps 6, and the bulge portions 7d and 70d formed at the small-diameter portions 7b and 70b to bulge outside in the radial directions. The rigidities at the open end sides 7k and 70k of the bulge portions 7d and 70d is lower than the rigidities at the base end sides 7j and 70j of the bulge portions 7d and 70d.

In this configuration, when attaching the dust boots 7 and 70 to the bump caps 6, the dust boots 7 and 70 are in the states where the bulge portions 7d and 70d elastically deform in the circumferential directions of the small-diameter portions 7b and 70b, and the perimeters of the small-diameter portions 7b and 70b are extended. At this time, the open end sides 7k and 70k deform more largely than the base end sides 7j and 70j at the bulge portions 7d and 70d. Thus, the small-diameter portions 7b and 70b radially expand in the taper shapes such that the expansion at the open end sides 7i and 70i become larger than the expansion at the base end sides 7h and 70h. This allows the small-diameter portions 7b and 70b of the dust boots 7 and 70 to easily climb over the convex portions 6a of the bump caps 6, even if the force pressing the dust boots 7 and 70 to the bump caps 6 is small. Accordingly, the attachability of the dust boots 7 and 70 can be improved.

Embodiments of this invention were described above, but the above embodiments are merely examples of applications of this invention, and the technical scope of this invention is not limited to the specific constitutions of the above embodiments.

For example, in the above-described embodiments, the cylinder devices had been described as the shock absorbers 100 and 200 for automobile. However, the cylinder devices may be, for example, for two wheels, for rail car, for residence, for home appliance, for industrial machinery, and for power-generating/providing equipment. The cylinder devices may be, for example, actuators.

In the above-described embodiments, the cover members had been described as the dust boots 7 and 70 of the shock absorbers 100 and 200. However, the cover members may be dust covers used for respective portions of, for example, the two wheels, the rail car, the residence, the home appliance, the industrial machinery, and the power-generating/providing equipment. Other than the dust covers, the cover members may be, for example, harness covers and hose covers.

In the above-described embodiments, the dust boots 7 and 70 are made of resin. However, material other than the resin may be used insofar as the bulge portions 7d and 70d are elastically deformable in the circumferential directions of the small-diameter portions 7b and 70b. Accordingly, as the material of the dust boots 7 and 70, for example, various material such as rubber, spring steel, and cloth can be used.

In the above-described embodiments, the shock absorbers 100 and 200 have been described as the strut-type shock absorbers. However, the shock absorbers 100 and 200 may be shock absorbers other than the strut-type shock absorbers, and for example, may be shock absorbers at which the coil springs are arranged in different bodies.

In the above-described embodiments, the convex portions 6a of the bump cap 6 are disposed at the three positions equally divided in the circumferential direction at the outer peripheral surface of the bump cap 6. However, the number of the convex portions 6a may be two or less, or four or more. Disposition of the convex portions 6a in the circumferential direction may be dividing unequally.

In the above-described embodiments, the bulge portions 7d and 70d of the dust boots 7 and 70 are disposed each at the eight positions. However, the numbers of the bulge portions 7d and 70d may be each seven or less, or nine or more.

With respect to the above description, the contents of application No. 2014-224623, with a filing date of Nov. 4, 2014 in Japan, and the contents of application No. 2014-224630, with a filing date of Nov. 4, 2014 in Japan, are incorporated herein by reference.

The invention claimed is:

1. A cylinder device, comprising:
    a cylinder that has one end from which a piston rod extends;
    a pipe-shaped cover member that has an extendable bellows portion and a small-diameter portion whose inner diameter is smaller than an inner diameter of the bellows portion, the cover member being configured to protect the piston rod; and
    a capping member fitted into the cylinder, the capping member having a convex portion to which the small-diameter portion of the cover member is locked, at an outer periphery, wherein
    at the small-diameter portion of the cover member, a bulge portion that bulges outside in a radial direction is formed, and
    a rigidity at an open end side of the bulge portion is lower than a rigidity at a base end side of the bulge portion.

2. The cylinder device according to claim 1, wherein a circumferential length of the bulge portion at the open end side is longer than a circumferential length of the bulge portion at the base end side.

3. The cylinder device according to claim 1, wherein a bulge at the open end side of the bulge portion is larger than a bulge at the base end side of the bulge portion.

4. The cylinder device according to claim 1, wherein a plate thickness at the open end side of the bulge portion is thinner than a plate thickness at the base end side of the bulge portion.

5. The cylinder device according to claim 1, wherein
a plurality of the convex portions of the capping member are disposed a circumferential direction.

6. The cylinder device according to claim 1, wherein
the small-diameter portion is connected to the bellows portion at the base end side, and extends away from the bellows portion in an axial direction of the cylinder device from the base end side to the open end side.

7. The cylinder device according to claim 6, wherein
the bulge portion has
two radial direction portions extending outwardly in the radial direction, and
a circumferential direction portion connecting the two radial direction portions with each other, and
a total length of the two radial direction portions and the circumferential direction portion of the bulge portion at the open end side is longer than at the base end side.

8. A cylinder device, comprising:
a cylinder that has one end from which a piston rod extends;
a pipe-shaped cover member that has an extendable bellows portion and a small-diameter portion whose inner diameter is smaller than an inner diameter of the bellows portion, the cover member being configured to protect the piston rod; and
a capping member fitted into the cylinder, the capping member having a convex portion to which the small-diameter portion of the cover member is locked, at an outer periphery, wherein
at the small-diameter portion of the cover member, a bulge portion that bulges outside in a radial direction is formed, and
a plate thickness of a radial direction portion of the bulge portion is thinner than a plate thickness of a circumferential direction portion of the bulge portion.

9. The cylinder device according to claim 8, wherein
a circumferential length of the bulge portion at an open end side of the bulge portion is longer than a circumferential length of the bulge portion at a base end side of the bulge portion.

10. The cylinder device according to claim 8, wherein
a bulge at an open end side of the bulge portion is larger than a bulge at a base end side of the bulge portion.

11. The cylinder device according to claim 8, wherein
a plate thickness at an open end side of the bulge portion is thinner than a plate thickness at a base end side of the bulge portion.

12. The cylinder device according to claim 8, wherein
a plurality of the convex portions of the capping member are disposed in a circumferential direction.

13. The cylinder device according to claim 8, wherein
the bulge portion has a further radial direction portion,
the radial direction portion and the further radial direction portion of the bulge portion extend outwardly in the radial direction, and are connected with each other by the circumferential direction portion, and
the plate thickness of the radial direction portion and a plate thickness of the further radial direction portion are thinner than the plate thickness of the circumferential direction portion.

14. A cylinder device, comprising:
a cylinder that has one end from which a piston rod extends;
a pipe-shaped cover member that has an extendable bellows portion and a small-diameter portion whose inner diameter is smaller than an inner diameter of the bellows portion, the cover member being configured to protect the piston rod; and
a capping member fitted into the cylinder, the capping member having a convex portion to which the small-diameter portion of the cover member is locked, at an outer periphery, wherein
at the small-diameter portion of the cover member, a bulge portion that bulges outside in a radial direction is formed, and
at an end portion at a base end side of the small-diameter portion of the cover member, a flat portion that extends outside in the radial direction in a flanged shape is disposed, the flat portion being locked to the convex portion of the capping member.

15. The cylinder device according to claim 14, wherein
a circumferential length of the bulge portion at an open end side of the bulge portion is longer than a circumferential length of the bulge portion at a base end side of the bulge portion.

16. The cylinder device according to claim 14, wherein
a bulge at an open end side of the bulge portion is larger than a bulge at a base end side of the bulge portion.

17. The cylinder device according to claim 14, wherein
a plate thickness at an open end side of the bulge portion is thinner than a plate thickness at a base end side of the bulge portion.

18. The cylinder device according to claim 14, wherein
a plurality of the convex portions of the capping member are disposed in a circumferential direction.

* * * * *